(12) United States Patent
Liu et al.

(10) Patent No.: US 11,215,171 B2
(45) Date of Patent: Jan. 4, 2022

(54) FIELD EMISSION NEUTRALIZER

(71) Applicants: Tsinghua University, Beijing (CN); HON HAI PRECISION INDUSTRY CO., LTD., New Taipei (TW)

(72) Inventors: Peng Liu, Beijing (CN); Duan-Liang Zhou, Beijing (CN); Chun-Hai Zhang, Beijing (CN); Li Qian, Beijing (CN); Yu-Quan Wang, Beijing (CN); Xue-Wei Guo, Beijing (CN); Li-Yong Ma, Beijing (CN); Fu-Jun Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/661,180

(22) Filed: Oct. 23, 2019

(65) Prior Publication Data
US 2021/0017967 A1 Jan. 21, 2021

(30) Foreign Application Priority Data
Jul. 16, 2019 (CN) .......................... 201910642704.1

(51) Int. Cl.
*F03H 1/00* (2006.01)
*H01M 4/583* (2010.01)
(Continued)

(52) U.S. Cl.
CPC ......... *F03H 1/0025* (2013.01); *C01B 32/158* (2017.08); *F03H 1/005* (2013.01);
(Continued)

(58) Field of Classification Search
CPC ........ F03H 1/00; F03H 1/0037; F03H 1/0025; F03H 1/005
See application file for complete search history.

(56) References Cited

U.S. PATENT DOCUMENTS

| 7,648,406 B2* | 1/2010 | Tai ........................ H01J 29/481 445/50 |
| 2007/0103048 A1 | 5/2007 | Liu et al. |

(Continued)

FOREIGN PATENT DOCUMENTS

| CN | 1959896 | 5/2007 |
| CN | 101880035 | 11/2010 |

(Continued)

OTHER PUBLICATIONS

Ohkawa "Operation of a carbon nanotube field emission cathode in low Earth orbit" (Year: 2019).*

(Continued)

*Primary Examiner* — Arun Goyal
*Assistant Examiner* — William L Breazeal
(74) *Attorney, Agent, or Firm* — ScienBiziP, P.C.

(57) ABSTRACT

A field emission neutralizer is provided. The field emission neutralizer includes a bottom plate and a field emission cathode unit located on the bottom plate. The field emission cathode unit includes a substrate, a shell located on the substrate, a cathode emitter located inside the shell, a mesh grid insulated from the cathode emitter, and a shielding layer insulated from the mesh grid. The cathode emitter includes a cathode substrate and a graphitized carbon nanotube array. The graphitized carbon nanotube array is in electrical contact with the cathode substrate. The graphitized carbon nanotube array is fixed on a surface of the substrate body, (Continued)

and the carbon nanotubes of the graphitized carbon nanotube array are substantially perpendicular to the cathode substrate.

16 Claims, 4 Drawing Sheets

(51) Int. Cl.
*C01B 32/158* (2017.01)
*B82Y 30/00* (2011.01)

(52) U.S. Cl.
CPC ............ *H01M 4/583* (2013.01); *B82Y 30/00* (2013.01); *C01B 2202/36* (2013.01)

(56) References Cited

U.S. PATENT DOCUMENTS

| | | | |
|---|---|---|---|
| 2008/0203884 A1* | 8/2008 | Zheng | H01J 29/04 |
| | | | 313/309 |
| 2011/0318255 A1 | 12/2011 | Liu et al. | |
| 2011/0318984 A1 | 12/2011 | Liu et al. | |
| 2012/0161607 A1* | 6/2012 | Liu | H01J 29/04 |
| | | | 313/309 |
| 2013/0214244 A1 | 8/2013 | Sanborn et al. | |
| 2014/0184092 A1* | 7/2014 | Liu | H01J 31/127 |
| | | | 315/291 |
| 2017/0367168 A1* | 12/2017 | McDonald | H05H 1/24 |

FOREIGN PATENT DOCUMENTS

| | | |
|---|---|---|
| CN | 101898758 | 12/2010 |
| TW | M286990 | 2/2006 |
| WO | 9805920 | 2/1998 |

OTHER PUBLICATIONS

Gao "Field emission of large-area and graphitized carbon nanotube array on anodic aluminum oxide template" (Year: 2003).*
Lee "Enhanced and stable electron emission of carbon nanotube emitters with graphitization" (Year: 2015).*
Seah "Synthesis of aligned carbon nanotubes" (Year: 2011).*
Yu Zhi-qiang et al., Development of Electric Propulsion and Hollow Cathode Assembly/Neutralizer, Vacuum Electronics, pp. 1-5. Mar. 2013.

* cited by examiner

FIELD EMISSION NEUTRALIZER

CROSS-REFERENCE TO RELATED APPLICATIONS

This application claims all benefits accruing under 35 U.S.C. § 119 from China Patent Application No. 201910642704.1, filed on Jul. 16, 2019, in the China National Intellectual Property Administration, the contents of which are hereby incorporated by reference. The application is also related to copending applications entitled, "ION THRUSTER", filed Oct. 23, 2019 Ser. No. 16/661,163. The application is also related to copending applications entitled, "FIELD EMISSION NEUTRALIZER", filed Oct. 23, 2019 Ser. No. 16/611,173. The application is also related to copending applications entitled, "ION THRUSTER", filed Oct. 23, 2019 Ser. No. 16/661,183.

FIELD

The present disclosure relates to a field emission neutralizer, particularly to a field emission neutralizer using a carbon nanotube structure.

BACKGROUND

A main function of the field emission neutralizer is to emit electrons, and the electrons emitted from the field emission neutralizer can neutralize positive ion charges. The field emission neutralizer is an important part of a space electric propeller; the filed emission neutralizer is used to prevent accumulation of system charges by emitting electrons. Failure of the filed emission neutralizer may cause the space electric propeller to fail to start, or a voltage of the space electric propeller rises to tens of thousands of volts.

Carbon nanotubes have excellent electrical conductivity and high electron emission efficiency; thus, carbon nanotubes are suitable for cathode emitters of the field emission neutralizer. However, in conventional field emission neutralizers using carbon nanotubes as cathode emitters, the carbon nanotubes are randomly arranged, an emission efficiency of conventional field emission neutralizers is low. Further, in conventional field emission neutralizers using carbon nanotubes as cathode emitters, carbon nanotubes are not graphitized, a microstructure of the carbon nanotubes has large growth defects, such as a chaotic structure, dislocations and defects in a crystallite structure, contains non-carbon atoms and amorphous carbon, and has small crystallinity. Therefore, carbon nanotubes can turn into powders easily, resulting in lower efficiency in emitting electrons and even failure to emit electrons.

BRIEF DESCRIPTION OF THE DRAWINGS

Implementations of the present technology will now be described, by way of embodiments, with reference to the attached figures, wherein.

DETAILED DESCRIPTION

Figure 1:
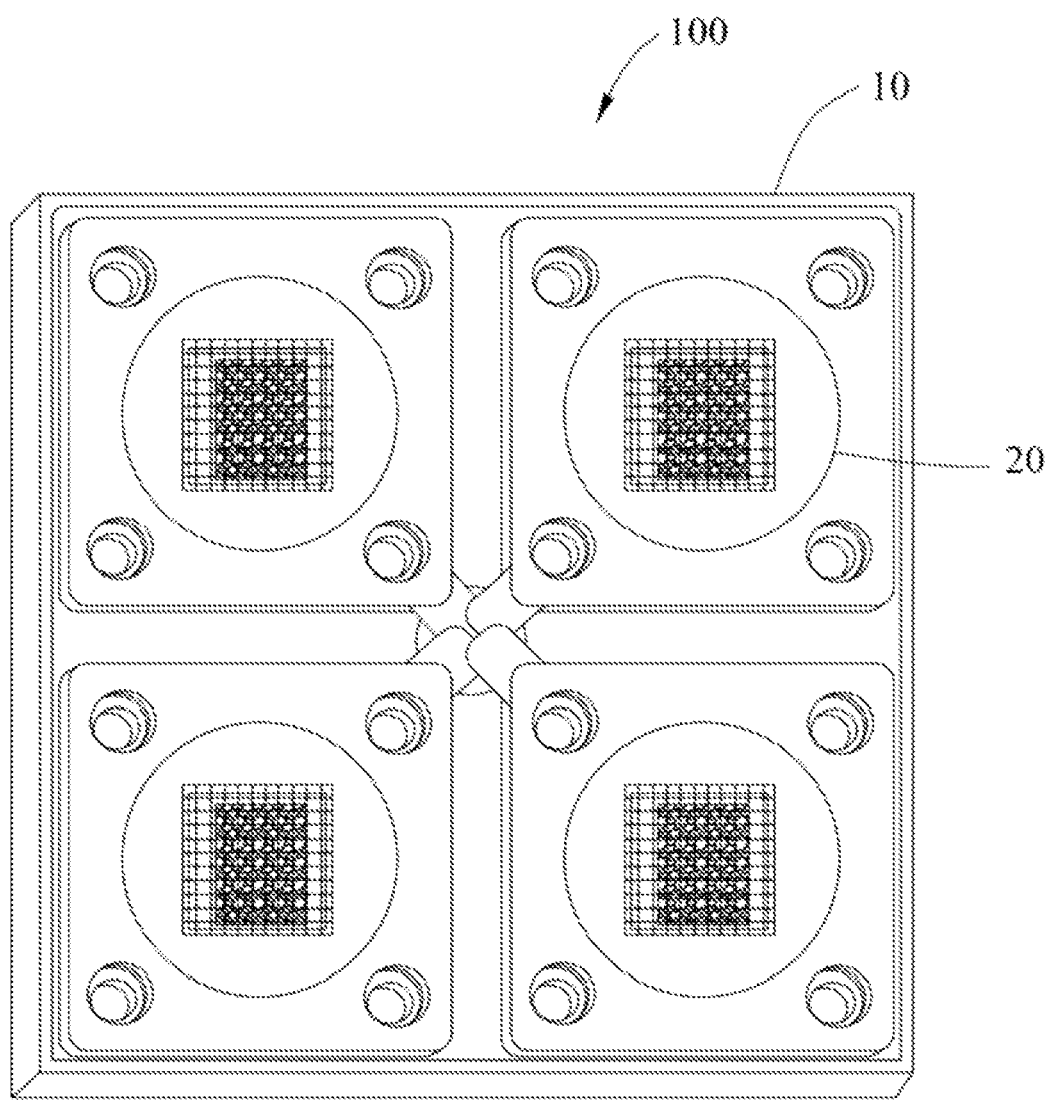
FIG. 1 shows a top view schematic diagram of one embodiment of a field emission neutralizer.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

FIG. 1 illustrates a field emission neutralizer 100. The field emission neutralizer 100 comprises a bottom plate 10 and at least one field emission cathode unit 20. The at least one field emission cathode unit 20 is located on the bottom plate 10. When the field emission neutralizer 100 comprises at least two field emission cathode units 200, the at least two field emission cathode units are located on the bottom plate 10 and spaced from each other.

The at least one field emission cathode unit 20 can be fixed on a surface of the bottom plate 10 by adhesives, screw bolts or other means. In one embodiment, the field emission neutralizer 100 comprises four field emission cathode units 20, and the four field emission cathode units 20 are fixed on the surface of the bottom plate 10 by screw bolts.

Figure 2:
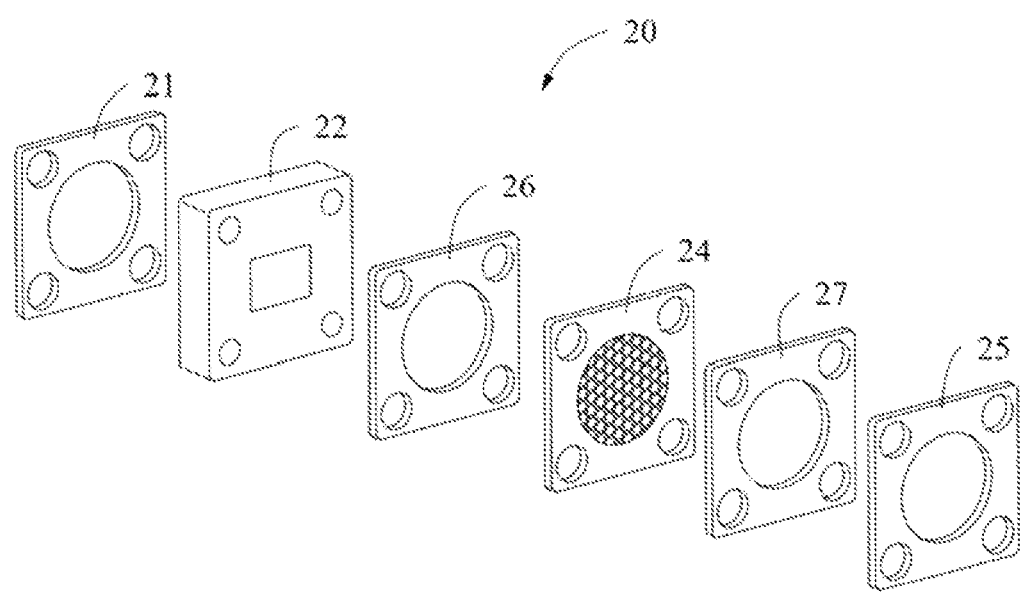
FIG. 2 shows a structural disassembly diagram of one embodiment of a field emission cathode unit.

Referring to FIG. 2, the field emission cathode unit 20 comprises a substrate 21, a shell 22, at least one cathode emitter 23, a mesh grid 24, and a shielding layer 25. The shell 22 is located on the substrate 21. The at least one cathode emitter 23 is located in the shell 22, and the at least one cathode emitter 23 is insulated and spaced from the mesh grid 24. The mesh grid 24 is insulated and spaced from the shielding layer 25. The shell 22 defines an opening 221. The mesh grid 24 comprises a plurality of gate holes 241, and the plurality of gate holes 241 is uniformly distributed. The shielding layer 25 comprises a first through-hole 251. The opening 221, the plurality of gate holes 241, and the first through-hole 251 communicate with each other. Electrons emitted from the at least one cathode emitter 23 are emitted through the opening 221, the plurality of gate holes 241, and the first through-hole 251.

Figure 3:
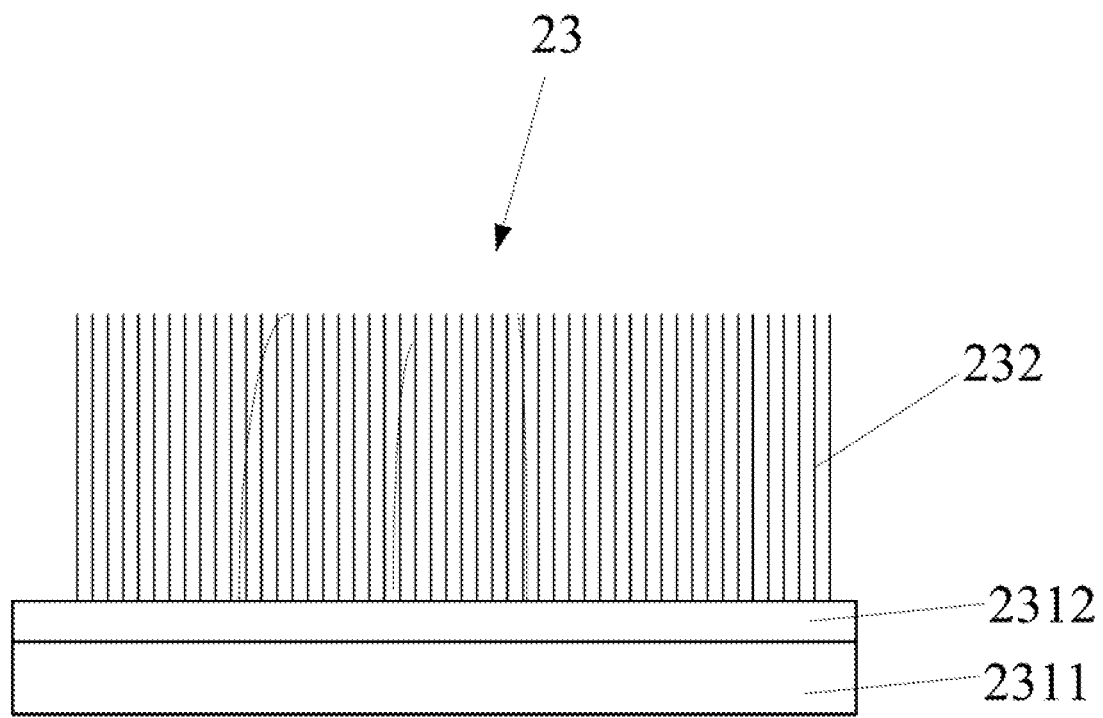
FIG. 3 shows a structure schematic diagram of one embodiment of a cathode emitter.

Referring to FIG. 3, the cathode emitter 23 comprises a cathode substrate 231 and a graphitized carbon nanotube array 232. The graphitized carbon nanotube array 232 refers that at least a portion of the carbon nanotubes in the carbon nanotube array is graphitized. In some embodiments, 50-80% of the carbon nanotubes in the graphitized carbon nanotube array 232 are graphitized, 50-80% is a quantity percentage.

A microstructure of carbon nanotubes has large growth defects, such as a chaotic structure, dislocations and defects in a crystallite structure, containing non-carbon atoms and amorphous carbon, and having small crystallinity. Graphitization of carbon nanotubes can transform microcrystal in carbon nanotubes from a turbostratic structure to a graphite morphological sheet structure; exclude non-carbon atoms, microcrystal rearrangements, microcrystal merger, and microcrystal growth; and graphitize amorphous carbon. Therefore, there are almost no dislocations and defects in the microstructure of the carbon nanotubes of the graphitized carbon nanotube array 232, the graphitized carbon nanotube array 232 is substantially a three-dimensional ordered graphite structure; and the graphitized carbon nanotube array 232 is free of impurities, such as catalysts used in the process of growing carbon nanotubes. And thus, the graphitized carbon nanotube array 232 has excellent electrical conductivity, thermal conductivity, and mechanical properties, the graphitized carbon nanotube array 232 can maintain its original shape during use, and does not become a powder, especially when used in a vacuum. Further, the graphitized carbon nanotube array 232 has excellent thermal stability and chemical stability, and thus the field emission neutralizer 100 is very suitable for application in space.

Along an extending direction of the carbon nanotubes of the graphitized carbon nanotube array 232, the graphitized carbon nanotube array 232 defines a first end and a second end opposite to the first end. The cathode substrate 231 comprises a substrate body 2311 and an adhesive layer 2312. The first end of the graphitized carbon nanotube array 232 is fixed on the substrate body 2311 by the adhesive layer 2312, and a plurality of carbon nanotubes of the graphitized carbon nanotube array 232 are substantially perpendicular to the substrate body 2311. The graphitized carbon nanotube array 232 is an electron emitter. The second end of the graphitized carbon nanotube array 232 away from the substrate body 2311 is an electron emission end. In one embodiment, the first end of the graphitized carbon nanotube array 232 is inserted into the adhesive layer 2312.

Figure 4:
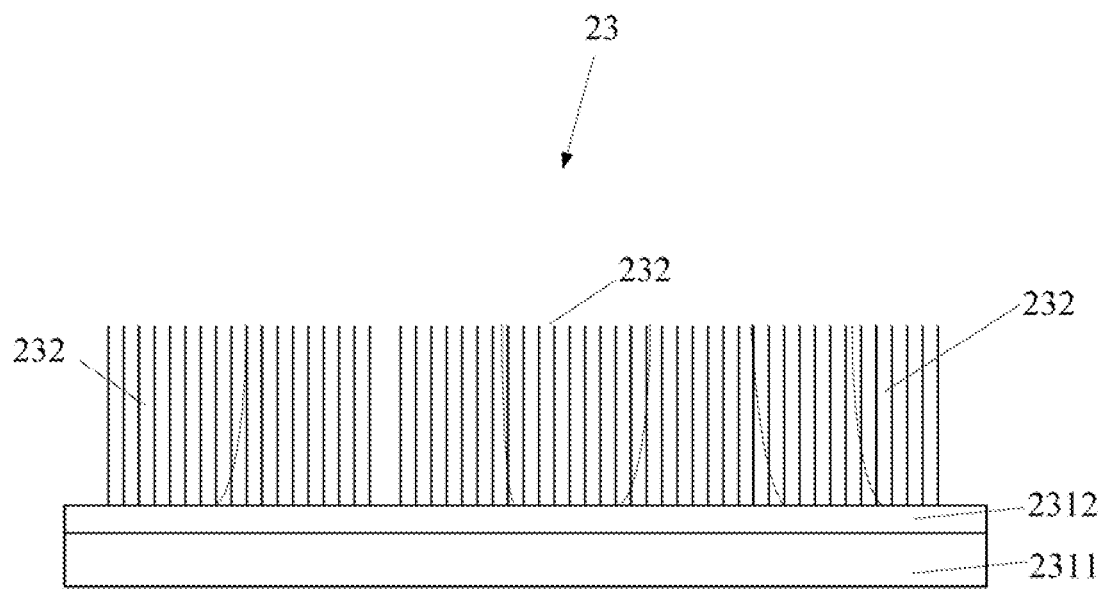
FIG. 4 shows a structure schematic diagram of one embodiment of a cathode emitter.

Referring to FIG. 4, in some embodiments, the cathode emitter 23 comprises a plurality of graphitized carbon nanotube arrays 232, the plurality of graphitized carbon nanotube arrays 232 are fixed side by side or spaced apart on the surface of the cathode substrate 231. The plurality of graphitized carbon nanotube arrays 232 can increase the electron emission and improve the emission efficiency. In some embodiments, the cathode emitter 23 comprises 2-4 graphitized carbon nanotube arrays 232 fixed on the surface of the cathode substrate 231 and spaced from each other.

In one embodiment, the graphitized carbon nanotube array 232 is obtained by graphitizing a super-aligned carbon nanotube array in an inert gas of about 2800° C. The high temperature graphitization heat treatment can improve a microstructure of carbon nanotubes, improve a crystallinity of carbon nanotubes, and remove high temperature volatile impurities such as metal catalysts in carbon nanotube array.

The super-aligned carbon nanotube array comprises a plurality of carbon nanotubes parallel to each other and perpendicular to a growth substrate. The plurality of carbon nanotubes of the super-aligned carbon nanotube array is in close contact with each other by van der Waals force. A small number of randomly arranged carbon nanotubes may exist in the super-aligned carbon nanotube array, the small number of randomly arranged carbon nanotubes do not affect an overall orientation of most of the carbon nanotubes of the super-aligned carbon nanotube array. The super-aligned carbon nanotube array is substantially free with impurities, such as amorphous carbon or residual catalyst metal particles.

A method of making the super-aligned carbon nanotube array can be a chemical vapor deposition method, an arc discharge method or an aerosol method. In one embodiment, the super-aligned carbon nanotube array is formed by the chemical vapor deposition method. Examples of the chemical vapor deposition method of making the super-aligned carbon nanotube array are taught by U.S. Pat. No. 8,048,256 to Feng et al.

In one embodiment, a method of making the cathode emitter 23 comprises: graphitizing a super-aligned carbon nanotube array to form a graphitized carbon nanotube array 232; pasting the surface of the graphitized carbon nanotube array 232 with the cathode substrate 231, to transfer the graphitized carbon nanotube array 232 to the surface of the cathode substrate 231, and the graphitized carbon nanotube array 232 is in electrical contact with the cathode substrate 231; and curing the adhesive layer 2312 to firmly bond the graphitized carbon nanotube array 232 to the cathode substrate 231. In one embodiment, graphitizing a super-aligned carbon nanotube array is carried out at 2800° C. Ar gas atmosphere.

In one embodiment, a carbon deposit layer is uniformly coated on a surface of the plurality of carbon nanotubes of the graphitized carbon nanotube array 232, the carbon deposit layer can increase a mechanical property of the graphitized carbon nanotube array 232; thereby increasing an emission stability of the field emission neutralizer 100.

A material of the substrate body 2311 can be selected from insulation materials, such as ceramic, glass, and silicon wafer with oxide layer on its surface. The material of the substrate body 2311 can also be selected from conductive materials, such as metal, silicon wafer, and glass with conductive layer on its surface. A material of the adhesive layer 2312 can be insulation material or conductive material. The material of the adhesive layer 2312 matches with the material of the substrate body 2311, when the material of substrate body 2311 is insulation materials, the material of the adhesive layer 2312 is conductive materials to make the graphitized carbon nanotube array 232 electrical contact with the cathode substrate 231; when the material of substrate body 2311 is conductive materials, the material of the adhesive layer 2312 can be conductive materials or insulation materials, as long as the graphitized carbon nanotube array 232 is electrically contacted with the cathode substrate 231. The adhesive layer 2312 can be formed on the surface of the substrate body 2311 by surface coating, screen printing or the like. When the substrate body 2311 is conductive materials and the adhesive layer 2312 is insulation materials, the first end of the graphitized carbon nanotube array 232 penetrate the adhesive layer 2312 to direct contact with the substrate body 2311 and electrical contact with the cathode substrate 231. In one embodiment, the substrate body 2311 is a nickel sheet, and the adhesive layer 2312 is a silver paste.

A material of the substrate 21 is insulation material, such as glass, ceramic, and silica. In one embodiment, the material of the substrate 21 is ceramic. The substrate 21 is used to support the shell 22.

A material of the shell 22 can be a conductive material or an insulating material. In one embodiment, the material of the shell 22 is stainless steel. The shell 22 is used to hold the cathode emitter 23, to prevent the cathode emitter 23 from being contaminated and damaged by an external force. A shape of the shell 22 is not limited, as long as the cathode emitter 23 can be placed inside and electrons can be emitted outward through the opening 221. In one embodiment, the substrate body 2311 is fixed to the side wall of the shell 22. The substrate body 2311 is fixed to the side wall of the shell 22 by binder or screw bolt.

The cathode emitter 23 is electrically insulated from the mesh grid 24. In one embodiment, the material of the shell 22 is electrically conductive, the field emission neutralizer 100 further comprises a first insulating layer 26, and the first insulating layer 26 is located between the shell 22 and the mesh grid 24. The first insulating layer 26 can be an insulating plate, or a plurality of insulators disposed between the shell 22 and the mesh grid 24. In one embodiment, the first insulating layer 26 is the insulating plate, the insulating plate comprises a second through-hole 261, the second through hole 261 and the opening 221 on the shell 22 communicate with each other.

The mesh grid 24 is electrically insulated from the shielding layer 25. In one embodiment, the field emission neutralizer 100 further comprises a second insulating layer 27, and the second insulating layer 27 is located between the mesh grid 24 and the shielding layer 25, to make the mesh grid 24 insulated from the shielding layer 25. The second insulating layer 27 can be an insulating plate, or a plurality of insulators disposed between the mesh grid 24 and the shielding layer 25. In one embodiment, the second insulating layer 27 is the insulating plate, the insulating plate comprises a third through hole 271, the third through hole 271 and the plurality of gate holes 241 on the mesh grid 24 communicate with each other.

A material of each of the first insulating layer 26 and the second insulating layer 27 can be an insulating material such as glass, ceramic or silicon dioxide. In one embodiment, the material of the first insulating layer 26 and the material of the second insulating layer 27 are both ceramics.

The substrate 21, the shell 22, the first insulating layer 26, the mesh grid 24, the second insulating layer 27, and the shielding layer 25 are sequentially stacked and fixed together. The substrate 21, the shell 22, the first insulating layer 26, the mesh grid 24, the second insulating layer 27, and the shielding layer 25 can be fixed together by adhesive, welding, or screws. In one embodiment, the substrate 21, the shell 22, the first insulating layer 26, the mesh grid 24, the second insulating layer 27, and the shielding layer 25 are fixed together by screws.

In one embodiment, the mesh grid 24 is a metal mesh structure. The mesh grid 24 comprises the plurality of gate holes 241 uniformly distributed, and electrons emitted from the graphitized carbon nanotube array 232 can be emitted outside through the plurality of gate holes 241. In some embodiments, a distance between the mesh grid 24 and the cathode emitter 23 ranges from 100 micrometers to 200 micrometers. In one embodiment, the mesh grid 24 is a square molybdenum mesh, and a distance between the square molybdenum mesh and the cathode emitter 23 is about 150 micrometers.

A material of the shielding layer 25 is a conductive material, such as metal or metal alloy. In one embodiment, the shielding layer 25 is a stainless steel plate.

In one embodiment, the field emission neutralizer 100 further comprises a conductive layer (not shown), and the conductive layer is in electrical contact with the substrate body 2311 of the cathode substrate 231. A first electrode wire is connected to the conductive layer to supply a voltage to the cathode substrate 231. A second electrode wire is connected to the mesh grid 24 to supply a voltage to the mesh grid 24. The conductive layer can be selected, as long as the voltage can be supplied to the cathode substrate 231 through the electrode wire. In one embodiment, the substrate body 2311 is a conductive material, and the electrode lines are directly connected to the substrate body 2311. In one embodiment, the adhesive layer 2312 is a conductive material, and the electrode wires are directly connected to the adhesive layer 2312.

When the field emission neutralizer 100 is applied, different voltages are applied to the cathode substrate 231 and the mesh grid 24, respectively, a voltage difference can be formed between the cathode substrate 231 and the mesh grid 24; the electrons emitted from the graphitized carbon nanotube array 232 move toward the mesh grid 24 under an action of an electric field, and then are emitted through the first through-hole 251 of the shielding layer 25.

The field emission neutralizer provided by the invention has the following advantages: first, the carbon nanotubes of the graphitized carbon nanotube carbon nanotube array are free of impurities, there are almost no dislocations and defects in the microstructure of the graphitized carbon nanotube array, and the graphitized carbon nanotube array is substantially a three-dimensional ordered graphite structure, therefore, the graphitized carbon nanotube array has excellent electrical conductivity, thermal conductivity, and mechanical properties, thereby improving the emission efficiency of the field emission neutralizer; the graphitized carbon nanotube array can maintain its original shape during use, and will not become a powder, especially when used in a vacuum, thereby increasing the service life of the field emission neutralizer; the graphitized carbon nanotube array has excellent thermal stability and chemical stability, and thus the field emission neutralize provided by the invention is very suitable for application in space. Second, the plurality of carbon nanotubes of the graphitized carbon nanotube array is substantially perpendicular to the cathode substrate, thereby improving the emission efficiency and service life of the field emission neutralizer. Third, the graphitized carbon nanotube array is fixed on the cathode substrate by the adhesive layer, a combined force of the graphitized carbon nanotube array and the cathode substrate is large, therefore, the graphitized carbon nanotube array does not detach from the cathode substrate during the process of emitting electrons, and the emission efficiency and service life of the field emission neutralizer are improved.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A field emission neutralizer comprising:
a bottom plate; and at least one field emission cathode unit located on the bottom plate, each field emission cathode unit of the at least one field emission cathode unit comprising:

a first substrate;

a shell located on the first substrate and comprising an opening, wherein a material of the shell is a conductive material, the shell comprises a first surface and a second surface opposites to the first surface, and the first surface directly contacts with the first substrate;

a cathode emitter located in the shell, and comprising a second substrate and a graphitized carbon nanotube array, wherein the graphitized carbon nanotube array comprises a plurality of carbon nanotubes, and wherein the graphitized carbon nanotube array is super aligned and electrically connected with the second substrate; and wherein a majority of the plurality of carbon nanotubes are parallel to each other and perpendicular to the second substrate, and a few randomly arranged carbon nanotubes exist in the graphitized carbon nanotube array, and the few randomly arranged carbon nanotubes do not affect an overall orientation of the plurality of carbon nanotubes;

a first insulating layer located on the second surface of the shell and comprising a first through-hole;

a mesh grid comprising a plurality of gate holes and located on a surface of the first insulating layer away from the second surface of the shell, wherein the mesh grid is insulated from the cathode emitter; and a shielding layer comprising a second through-hole and being electrically insulated from the mesh grid, wherein the shell, the first insulating layer, and the mesh grid are stacked with each other, the opening, the plurality of gate holes, the first through-hole and the second through-hole communicate with each other, the graphitized carbon nanotube array is fixed on a first surface of the first substrate, and the plurality of carbon nanotubes of the graphitized carbon nanotube array are perpendicular to the second substrate.

2. The field emission neutralizer of claim 1, wherein the second substrate comprises a substrate body and an adhesive layer, and the graphitized carbon nanotube array is fixed on a second surface of the substrate body by the adhesive layer.

3. The field emission neutralizer of claim 2, wherein the graphitized carbon nanotube array defines a first end and a second end opposite to the first end, the plurality of carbon nanotubes of the graphitized carbon nanotube array extends from the first end to the second end, and the first end of the graphitized carbon nanotube array is inserted into the adhesive layer.

4. The field emission neutralizer of claim 1, wherein the cathode emitter comprises a plurality of graphitized carbon nanotube arrays, and the plurality of graphitized carbon nanotube arrays are spaced apart and fixed on the substrate body.

5. The field emission neutralizer of claim 1, wherein the graphitized carbon nanotube array is free of impurities.

6. The field emission neutralizer of claim 1, wherein 50% to 80% of the plurality of carbon nanotubes of the graphitized carbon nanotube array are graphitized, wherein 50% to 80% is a quantity percentage of the plurality of carbon nanotubes.

7. The field emission neutralizer of claim 1, wherein the graphitized carbon nanotube array is a three-dimensional ordered graphite structure.

8. The field emission neutralizer of claim 1, wherein the first insulating layer is an insulating plate or a plurality of insulators located between the shell and the mesh grid.

9. The field emission neutralizer of claim 1, wherein the first insulating layer is an insulating plate, the insulating plate comprises a third through hole, and the third through hole and the opening on the shell communicate with each other.

10. The field emission neutralizer of claim 1, wherein a distance between the mesh grid and the cathode emitter ranges from 100 micrometers to 200 micrometers.

11. The field emission neutralizer of claim 1, wherein the shielding layer is a stainless steel plate.

12. The field emission neutralizer of claim 2, further comprising a conductive layer, wherein the conductive layer is electrically connected with the substrate body.

13. The field emission neutralizer of claim 1, wherein the field emission neutralizer configured for operation in a vacuum.

14. The field emission neutralizer of claim 2, wherein the substrate body is fixed to a side wall of the shell by binder or screw bolt.

15. The field emission neutralizer of claim 1, wherein the first substrate, the shell, the first insulating layer, the mesh grid, and the shielding layer are fixed together by adhesive, welding, or screws.

16. The field emission neutralizer of claim 5, wherein the graphitized carbon nanotube array is free of catalysts used in a process of growing the graphitized carbon nanotube array.

* * * * *